Feb. 19, 1957 L. E. DILTS 2,781,796
MOUNT MAKING MACHINE FOR ELECTRIC LAMPS AND SIMILAR DEVICES
Filed Nov. 29, 1952 6 Sheets-Sheet 1

Inventor:
Lee E. Dilts,
by Vernet C. Kauffman
His Attorney.

Feb. 19, 1957 L. E. DILTS 2,781,796
MOUNT MAKING MACHINE FOR ELECTRIC LAMPS AND SIMILAR DEVICES
Filed Nov. 29, 1952 6 Sheets-Sheet 2

Inventor:
Lee E. Dilts,
by Vermut C. Kauffman
His Attorney.

Feb. 19, 1957 L. E. DILTS 2,781,796
MOUNT MAKING MACHINE FOR ELECTRIC LAMPS AND SIMILAR DEVICES
Filed Nov. 29, 1952 6 Sheets-Sheet 5

Inventor:
Lee E. Dilts,
by Vernet C. Kauffman
His Attorney.

Feb. 19, 1957   L. E. DILTS   2,781,796
MOUNT MAKING MACHINE FOR ELECTRIC LAMPS AND SIMILAR DEVICES
Filed Nov. 29, 1952   6 Sheets-Sheet 6

Inventor:
Lee E. Dilts,
by *His Attorney.*

United States Patent Office 2,781,796
Patented Feb. 19, 1957

2,781,796

MOUNT MAKING MACHINE FOR ELECTRIC LAMPS AND SIMILAR DEVICES

Lee E. Dilts, South Euclid, Ohio, assignor to General Electric Company, a corporation of New York Application November 29, 1952, Serial No. 323,315

5 Claims. (Cl. 140—71.6)

My invention relates to a machine for making mounts suitable for electric lamps and similar devices. Such mounts are composed of a stem comprising a stem tube having lead-in wires (leads) sealed therein and protruding therefrom with a filament mounted thereon. In the case of electric discharge devices such as fluorescent lamps, the filament is usually coated with an electron emissive material, such as alkaline earth oxides, and functions as a cathode.

In certain types of fluorescent lamps, the filament or cathode is mounted substantially in the projected axis of the stem tube and the lead-in wires are suitably shaped to engage and support the filament in that position. In certain cases the mount also includes a shield member surrounding the filament. It is an object of my invention to provide a machine for automatically forming such a mount.

A feature of my invention is the provision of mechanism for preparing a pair of leads projecting beyond an end of the stem to hold the filament or cathode aligned with the longitudinal axis of said stem, said preparation being characterized by the trimming of said leads to respective different lengths and the bending of end portions of said leads toward each other at points spaced apart along the projected axis of the stem.

Another feature of my invention is automatically operated apparatus adapted to receive a filament in a horizontal position and to reorientate and mount the filament at a vertical position between the ends of the leads of a vertically disposed stem.

Still another feature of my invention is automatically operated apparatus for mounting a coiled filament between the laterally extending end portions of the pair of leads and for thereafter fixing the tension and pitch of the coils of the filament by rebending the said end portions of the leads.

In accordance with one aspect of my invention, the stems are presented to each of a succession of work stations in turn and the various steps of manufacture are performed in succession by mechanisms located at said work stations and actuated from a common source. In a preferred embodiment, the apparatus is operated in combination with stem making apparatus in the manner of the mount making apparatus disclosed in Flaws Patent 1,907,532 so as to provide a single manufacturing unit for the entire mount assembly and a common drive is provided for the mount making apparatus and the stem making apparatus to effect properly timed operation and proper relative cooperation between the elements thereof.

In the illustrated embodiment of the invention, the mount making mechanisms are arranged along the path of a carrier holding a stem, and the carrier first advances the stem to proper operative relation to a mechanism for trimming the ends of the leads to the correct length. The inclusion of the trimming device in the combination fixes the ends of the leads at a definite relative relation to the other mechanisms along said path. The trimming operation also has the function of dressing the end of each lead to a specific length, the length of one lead being approximately twice the length of the other, and is followed by a second operation by the same mechanism which flattens a relatively short terminal portion of the dressed ends. The trimming and flattening operations constitute the only operations taking place at this work station and are followed by an indexing motion of the carrier to advance the stem to another work station. The mechanism at this latter station bends the flattened end portions of both leads into hooks and is characterized by separate hook bending means at the respective positions of said end portions.

Further reshaping of the leads occurs in the next step of the manufacture which is performed at a succeeding work station along the path of the carrier, when end portions of said leads including the hooks are bent toward the projected longitudinal axis of the stem. The bending operation, in this case, provides for both of said hooks to be arranged at spaced relation along said axis by bending the end portion of each lead at approximately right angle toward the other lead and in the plane of the leads. The bending of said leads is performed by a unitary mechanism at one work station along the carrier, which mechanism has mounted adjacent thereto at the next work station a mechanism for arranging a coiled filament between the laterally extending end portions of the leads and a second mechanism for attaching said filament thereto by clamping the open hooks onto opposite end portions of the filament. The filament is fed by a transfer device of a construction suited to receive a filament arranged horizontally, and to turn said filament to a vertical position so as to bring the opposite end portions thereof into the oppositely facing hooks in the leads. The hooks in the leads are closed by the clamping portions of the second mechanism at this latter station.

A mount reforming mechanism at another following work station provides for the rebending of the laterally extending portions of the leads to place the filament under a slight tension and to space the coils thereof at the correct pitch.

Another mechanism, separately claimed in application Serial No. 323,212, of F. J. Grube et al., entitled "Shield Forming and Mounting Method and Apparatus," filed of even date and assigned to the same assignee as this application, provides for the formation of a cylindrical metal shield, the transfer of said shield to a position around the filament and incorporation of said shield into the mount by attaching it to one of the leads.

Further features and advantages of our invention will appear from the following detailed description of a species thereof and from the drawing.

Figures 1, 2, 3, 4:
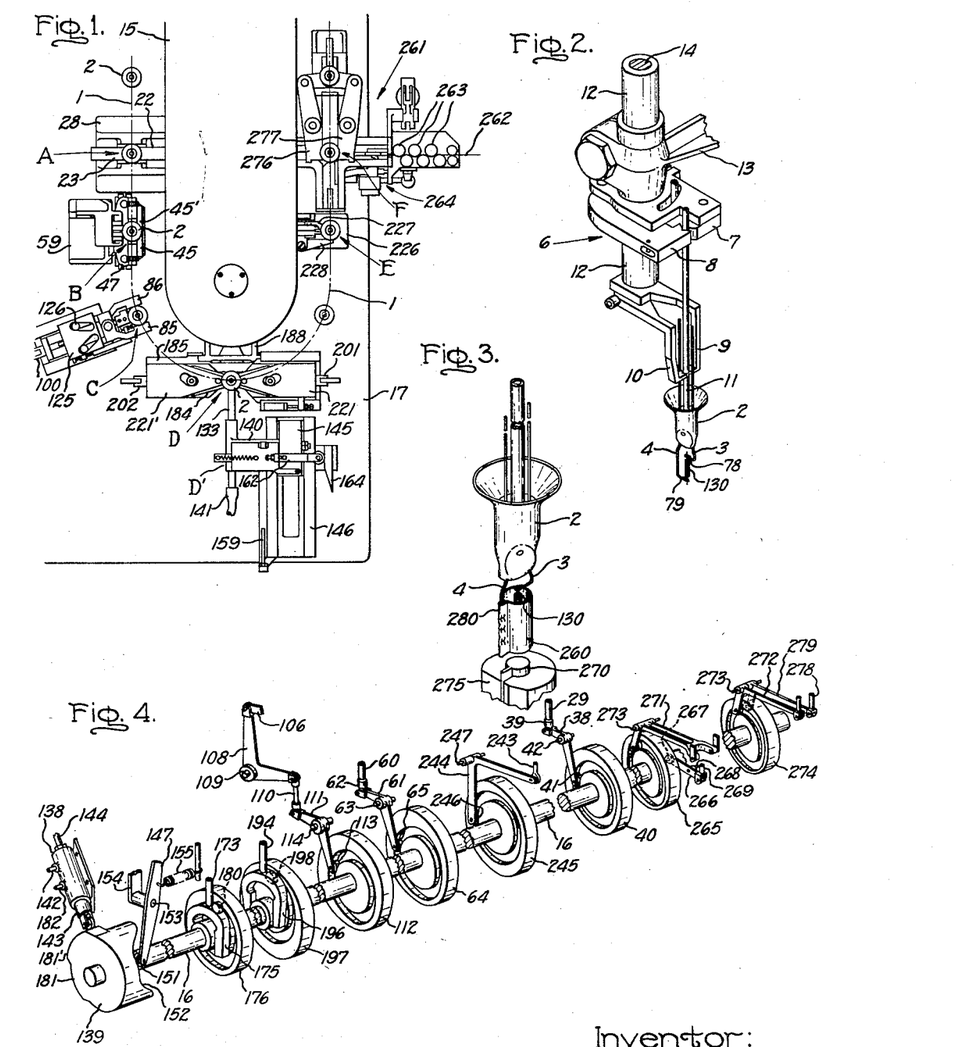
Fig. 1 is a plan view of a mount making machine comprising the invention.
Fig. 2 is a perspective view of one of the heads of the stem carrier holding a stem with a filament mounted thereon.
Fig. 3 is a perspective view of a mount complete with a shield, and also showing the upper ends of a mandrel and stripper of the shield-forming and mounting apparatus at their relative position thereto at station F.
Fig. 4 is a somewhat diagrammatic perspective view of the main drive shaft of the machine and the associated cam controlled actuating means for the various work mechanisms.

The machine illustrated in the drawing effects the making of the mount progressively at the succession of work stations A to F inclusive along the path 1 of movement of a carrier, and is adapted to complete the mount from a stem 2 comprising a glass stem tube having leads 3 and 4 sealed therein and protruding therefrom and also including an exhaust tube 11. The stem 2 is presented with its longitudinal axis vertical and so arranged that the leads 3 and 4 are directed downward. Heads 6, like that shown in Fig. 2 (and disclosed in Flaws Patent 1,907,532) support the stems 2 at regularly spaced intervals along the carrier and definitely fix the position of said stems 2 at each of said work stations by the gripping force of pairs of jaws 7—8 and 9—10 in engagement with vertically spaced portions of the exhaust tube 11. The jaws 7 and 9 of each pair on each head 6 determine the position of the stem 2 in that they are mounted at fixed positions upon the hollow shaft 12 which is in turn retained by the bracket 13 representing one link of the carrier. The opposite jaws 8 and 10, although not shown in detail, are movable by rotation of a shaft 14 within said shaft 12. The gripping force of the jaws of the head 6 is sufficiently powerful to keep the stem 2 from turning from the position wherein the axis and both leads 3 and 4 are aligned with the path 1 of movement, and maintains the stem 2 in position while it is carried to mount making mechanisms located along both sides and adjacent an end of the stationary center support 15 which defines the path of movement of the brackets 13. As in the machine disclosed in Patent 1,907,532 herebefore referred to, the carrier is advanced intermittently in synchronism with the rotation of a main drive shaft 16 (Fig. 4) for the entire apparatus which shaft 16 is located below the table 17 and aligned with the support 15. The movements of the carrier and the main drive shaft 16 are fixed so that the interval consumed by one revolution of said shaft 16, which represents a cycle of operation of each of the mechanisms at the work stations, corresponds to the interval consumed by the advance of the heads 6 between successive work stations and the rest period of said heads 6 at one of said work stations.

Figure 5:
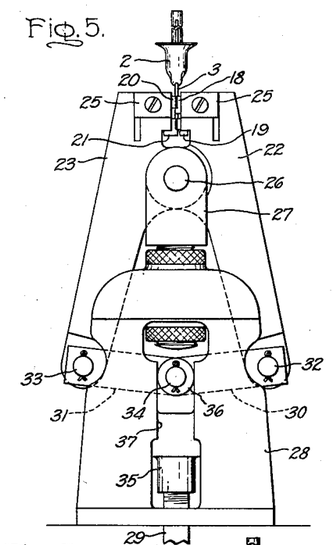
Fig. 5 is an elevation, taken transverse to the path of movement of the stem, of the lead trimming and flattening mechanism.
Figure 6:
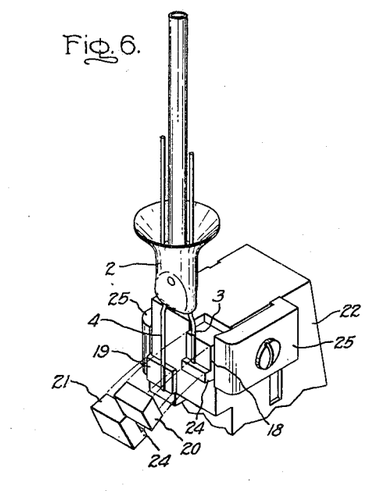
Fig. 6 is a perspective view, on a larger scale, of one of the jaws of the trimming and flattening mechanism in operative relation to the leads of a stem and with the cooperating trimming and flattening blocks of the opposite jaws spaced therefrom.

The first mount making operations to occur along the path 1 of movement of the stem 2 are the trimming and flattening operations of the mechanism (Figs. 5 and 6) located at work station A. These operations dress both leads 3 and 4 of the stem 2 by trimming off relatively short end portions thereof and effect this operation by bringing the die blocks 18—20 and 19—21 against portions of the respective leads 3 and 4 under the closing pressure of the jaws 22 and 23. The die blocks 18 and 21 have projecting lips 24 which cooperate with the sharp lower edges of the die blocks 20 and 19, respectively, to shear the leads 3 and 4. The die blocks 18 and 20 are displaced vertically in the jaws 22 and 23 from die blocks 19 and 21 so as to shear lead 3 shorter than lead 4. The over all position of the die blocks 18, 19, 20 and 21 is determined by the vertical position of the jaws 22 and 23 as each of said die blocks 18, 19, 20 and 21 is held in a notch in the respective jaws 22 and 23 by a clamp 25, and the pivot pin 26 for the said jaws 22 and 23 is mounted upon a yoke 27 threaded for vertical adjustment in the support standard 28 of the trimming and flattening mechanism.

The closing operation of the jaws 22 and 23 is brought about by a toggle arrangement wherein an upward motion of the operating rod 29 within a center opening in the base of the standard 28 spreads apart the lower ends of said jaws 22 and 23 under the influence of the links 30 and 31, respectively, which are connected by pins 32 and 33, respectively, to said jaws and by pin 34 to a fitting 35 on operating rod 29. Corresponding rollers 36 (only one being shown) on opposite ends of the pin 34 and within side slots 37 in the standard 28 limit the fitting 35 to vertical motion. The timing and extent of the closing operation of the jaws 22 and 23 is under the control of actuating means associated with the main drive shaft 16 (Fig. 4) which lies directly below the center of the carrier and the table 17 and which moves said operating rod 29 according to the pivotal motion of lever 38. The operating rod 29 is connected to one end of the lever 38 by the joint block 39 and is moved vertically by the motion introduced in the lever 38 by the turning of various portions of the track in cam 40 into engagement with a roller 41 on the opposite end of said lever 38. The pivot point for the lever 38 is the pin 42 which is retained by a stationary bracket (not shown) on the lower surface of the table 17.

The flattening operation of the trimming and flattening device occurs during the final closing movements of the jaws 22 and 23 when the full faces of the die blocks 18, 19, 20 and 21 contact the leads 3 and 4. This operation results in the cylindrical leads 3 and 4 being flattened to the extent that plane surfaces of the full height of the die blocks 19 and 20 are formed on two sides of end portions of said leads 3 and 4. The downward return motion of the push rod 29 spreads the die blocks 18, 19, 20 and 21 to positions on opposite sides of the leads 3 and 4 and clear of the path 1 of movement thereof.

Figure 7:
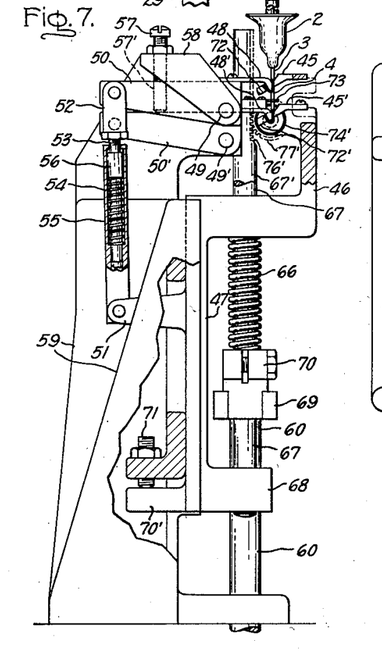
Fig. 7 is a side elevation, with portions broken therefrom, of the hook forming mechanism at the moment the operation of bending hooks in the ends of both leads has been completed.
Figure 8:
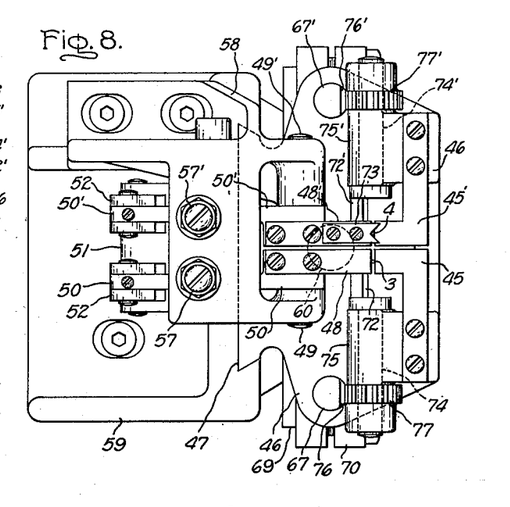
Fig. 8 is a plan view on a larger scale of the hook forming mechanism.
Figure 9:
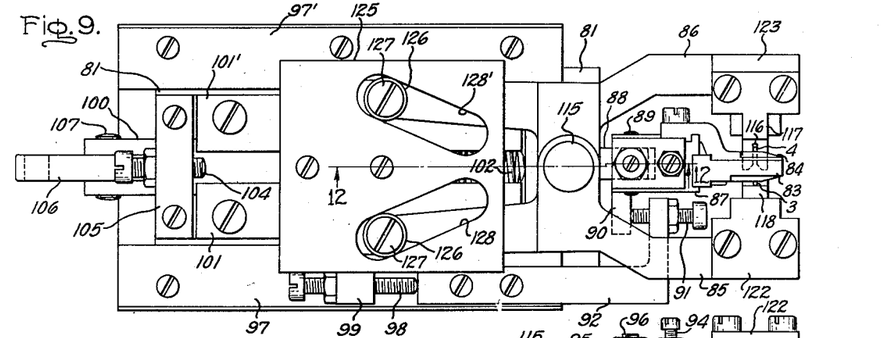
Figs. 9 and 10 are plan and side elevations, respectively, of the lead bending mechanism.
Figure 10:
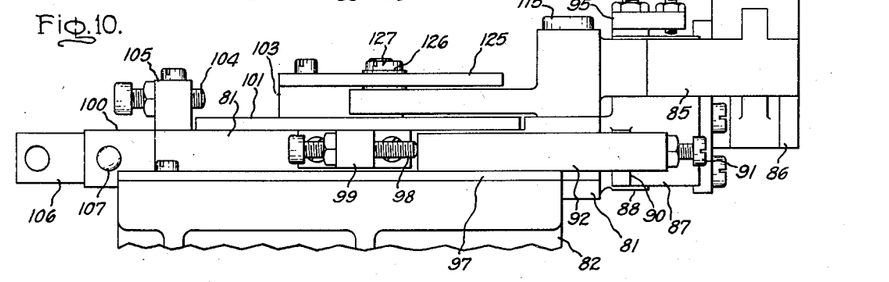

At station B, the next taken by the stem 2, open hooks are formed in both leads 3 and 4 by a mechanism (Figs. 7 and 8) which bends the lower half of the flattened end portions of said leads 3 and 4 sideward and then upward to positions adjacent the main extent thereof. The working or lead engaging elements of the hook forming device are at the moment of the index of the stem 2 at a retracted position below the path 1 of movement thereof and, when said stem 2 is finally arranged at work station B, start the cycle of operation by moving into operative relation to the leads 3 and 4. One of the positioning movements occurs when the backing members 45 and 45' on the outwardly projecting arm 46 of the slide 47 are carried to an operative relation to one side of end portions of the leads 3 and 4, respectively, by an upward movement of the slide 47. Another positioning movement, which occurs at the same time as the first-mentioned movement, is effected by downward and sideward motions of the anvils 48 and 48' as is effected by a clockwise swing thereof about the axes of the pivot pins 49 and 49', respectively, and cause the said anvils 48 and 48' to swing against side portions of the leads 3 and 4, respectively, opposite the backing members 45 and 45' so as to grip said lead 3 and 4. The positioning movement of the anvils 48 and 48' is effected by the motion of the anvil supporting arms 50 and 50' and is taken from the upward motion of the slide 47, said motion being introduced in the outer ends of the arms 50 and 50', which are each connected to rearwardly extending forked projections 51 on said slide 47, by a compressible connecting rod comprised of the yoke 52, the rod 53, the spring 54 and the sleeve 55. The enlargement 56 of the rod 53 rests against the inturned upper end of the sleeve 55 until the anvil 48 or 48' seats firmly against the lead 3 or 4 whereupon the excess motion of the slide 47 and the sleeve 55 is absorbed in the compression of the spring 54. Further control over the limit of movement of the anvils 48 and 48' is provided in the stop screws 57 and 57' which are carried by the support bracket 58, the means of support for the pivot pins 49 and 49', and which are engaged by the top surfaces of said arms 50 and 50' when the limit is reached. The support bracket 58, in turn, is attached to the main support standard 59 of the mechanism, which standard 59 retains the slide 47 by providing vertical ways therefore.

The vertical movements of the slide 47, which cause the positioning operations of the hook bending device as well as all other following operations thereof, are effected by the vertical movements of an operating rod 60 extending upward through the table 17 from actuating means associated with the main drive shaft 16. The operating rod 60 is connected to an operating lever 61 of the actuating means by the fitting 62 and is moved in accordance with the rotation of said lever 61 about the pivot pin 63 as is effected by the advance of different portions of the track in the face of cam 64 into engagement with the roller 65 on said lever 61.

For the period of these positioning operations, the vertical motion of the slide 47 is coextensive with that of the operating rod 60 by virtue of helical springs 66 (only one shown) which surround secondary operating rods 67 and 67' (Fig. 8) and are located between the arm portion 46 of slide 47 and collars 70 clamped to said rods 67, 67', the said collars 70 being engaged by slotted ends of a cross bar 69 attached to the upper end of rod 60. During this said period the lower bearings 68 on slide 47 are maintained against the said cross bar 69 by said springs 66. As previously described, the operation of the anvils 48 and 48' is limited independently of the movement of the slide 47 and is not coextensive therewith. The motion of the backing members 45 and 45', on the other hand, is directly dependent upon the movement of the slide 47 as said backing members 45 and 45' are mounted upon the projecting arm 46 thereof and is determined by the limit of movement allowed said slide 47 by the engagement of an ear 70' on the lower end thereof with the stop screw 71 on the support standard. Slots in the back of the ways in the standard 59 provide clearance for the rearwardly extending projections 51 and ear 70' of slide 47.

Still other operations of the hook bending mechanism are associated with the positioning movements of the backing members 45 and 45' and the anvils 48 and 48', said operations being the location of the longer lead 4 at the center of the faces of the backing member 45' and the anvil 48' and the arrangement of the lead bending fingers 72 and 72' opposite the ends of said leads 3 and 4. The location of the longer lead 4 is brought about by the gathering-in function of a V notch at the end of the finger 73 mounted upon the anvil 48' as said finger 73 is swung down to the position shown in the course of the movement of said anvil 48' into position beside said lead 4. The lead bending fingers 72 and 72', on the other hand, are, together with backing members 45 and 45', carried up to positions opposite the leads 3 and 4 by the movements of the slide 47, the said fingers 72, 72' being eccentrically positioned ends of essentially opposed spindles 74—74' located in journals 75 and 75' at opposite sides of the projecting arm 46 of the slide 47. The spindles 74 and 74' are at that time in a rotative position such that the lead bending fingers 72 and 72' bear against the oblique lower surface of end portions of said backing members 45 and 45' and are completely clear of the ends of the leads 3 and 4.

The bending operation is the next to occur in the hook bending mechanism. This operation forms hooks in both leads 3 and 4 by wiping the ends thereof over and up against the oblique lower surfaces of the anvils 48 and 48' and is the result of arcuate movements of the bending fingers 72—72' around the lower tips of said anvils 48 and 48' as created by the rotation of the spindles 74 and 74'. The bending fingers 72 and 72' are rotated by the continued upward movement of the operating rod 60 after the slide 47 has terminated its motion, and as said operating rod 60 lifts the cross bar 69 away from the lower bearing 68 in said slide 47 and pushes the secondary operating rods 67 and 67' upward in the said slide 47. The teeth of racks 76 and 76' in the upper end portions of the secondary operating rods 67 and 67' mesh with gears 77 and 77', respectively, on the ends of the spindles 74 and 74' and transform the lineal motion of the secondary operating rods 67 and 67' to the rotary motion required in said spindles 74 and 74' to rotate the bending fingers 72 and 72'. During the continued movement of the secondary operating rods 67 and 67', the springs 66 are compressed.

Further operations in the cycle of the hook bending mechanism provide for the disengagement of the mechanism from the leads 3 and 4 by the return downward movement of the operating rod 60. The disengagement of the hook forming mechanism from the leads 3 and 4 is the reverse of the operation required to make the hooks therein and, first, rotates the bending fingers 72 and 72' back alongside the backing members 45 and 45' and then swings the anvils 48 and 48' and lowers the backing members 45 and 45' to positions away from said hooks. The return rotation of the bending fingers 72 and 72' occurs when the spindles 74 and 74' are turned in a counter-clockwise direction, as viewed in Fig. 7, by the downward motion effected in the secondary operating rods 67 and 67' by the expansion of the springs 66 as the operating rod 60 and cross bar 69 move down. The upward and outward swing of the anvils 48 and 48' and the downward retraction of the backing members 45 and 45', on the other hand, occur when the downward motion of the cross bar 69 causes it to engage the lower bearing 68 and pull the slide 47 downward. The stem 2 is now indexed from work station B to C by the timed advance of the stem carrier.

Figures 11, 12:
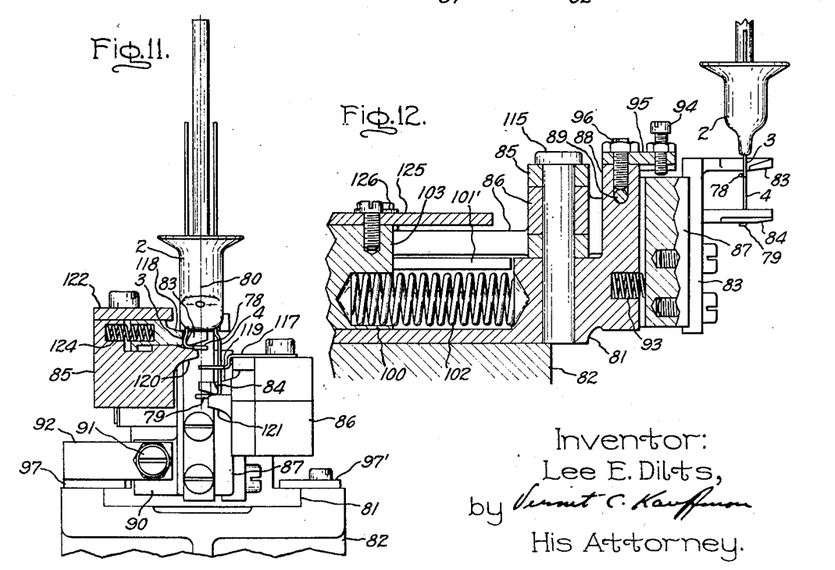
Fig. 11 is an elevation of the head end of said lead bending mechanism and a partially completed mount, the mechanism being shown in operative relation to said mount and with a section taken from one bending jaw.
Fig. 12 is a vertical section along the longitudinal center of the head end of the bending mechanism as indicated by the dash-dot line 12—12 of Fig. 9.

The step in the mount manufacture taking place at work station C consists in the bending of a corresponding end portion 78 and 79 of each lead 3 or 4 toward the opposite lead so that the open hooks therein lie across the longitudinal axis 80 of the stem 2 as shown in Fig. 11. This operation is in preparation for the next step in the mount manufacture in which a filament is arranged along said axis at a position permitting the open hooks to be closed upon the ends thereof and is performed by a lead bending mechanism temporarily located out of the path of movement of the leads 3 and 4 of the stem 2 during the advance thereof to and from work station C. The lead bending mechanism, shown in detail in Figs. 9, 10, 11 and 12, begins each cycle of operation by being advanced horizontally to operative relation to the stem 2, an operation which is effected by motion of the slide 81 in the ways of the support standard 82 (only partially shown) located adjacent said path 1 on the table 17. The advancing motion of the slide 81 carries the ends of the intermediate jaws or anvils 83 and 84 between the leads 3 and 4 at elevations above the hooked ends and slightly above the position said leads 3 and 4 are to be bent, and also carries the ends of the bending jaws 85 and 86 to positions on opposite sides of said leads 3 and 4. The anvils 83 and 84 are correspondingly attached to the front and side faces, respectively, of a block 87 which is, in turn, mounted upon an upwardly extending projection 88 at the front of the slide 81 by means of a pin 89. A further rearrangement of the anvils 83 and 84 also lowers them to positions directly opposite the place the leads 3 and 4 are to be bent when an ear 90 jutting out from the side of the lower portion of the block 87 is pressed against the stop screw 91 on the L-shaped arm 92 extending from stationary standard 82 and said block 87 is pivoted about the pin 89 sufficiently to lower said anvils 83 and 84 a limited amount. This motion of said anvils 83 and 84 is produced against the resistance of a helical spring 93 in a pocket in the forward projection 88 (Fig. 12) of the slide 81 behind the lower portion of the block 87, and tilts the top surface of the block 87 down away from the end of a stationary screw 94 which has heretofore fixed the position thereof. The screw 94 is retained by a tab 95 attached to the projection 88 by the locking nut and screw 96 which also have the function of holding the pivot pin 89 in place in said projection. All movement of the anvils 83 and 84 is complete, for a time, when the motion of the slide 81, which is retained in the ways of the standard 82 by the gibs 97 and 97' at opposite sides thereof, is interrupted by the engagement of a stop screw 98 in an ear 99 extending from one side thereof with the end of the L-shaped arm 92.

The operative functions of the bending mechanism, including those already described and effected by movement of the slide 81, are controlled by force applied to the sub-slide 100 located within longitudinal ways in said slide 81 below the gibs 101 and 101'. At the presently described moment there is no relative movement between slide 81 and sub-slide 100 because the expansion force of the helical spring 102 located behind the head end of said sub-slide 100 is sufficiently great to retain said sub-slide 100 at a position within the ways of the slide 81 where the end of the upstanding ridge 103 on said sub-slide 100 bears against the stop screw 104 in the block 105 on an end portion of said slide 81. The motion of the sub-slide 100, in turn, is effected by actuating means associated with the main drive shaft 16 (Fig. 4) and connected by the link 106 to the pin 107 at the back end of said sub-slide 100. The link 106, as shown in Fig. 4, is connected to one end of a bell crank 108 which is pivoted upon a pin 109 retained by a bracket (not shown) on the table 17 and which is actuated by the linkage 110 connecting it to the operating lever 11 adjacent the cam 112. A roller 113 within the track in the face of the cam 112 swings the operating lever 111 about a pivot pin 114 mounted upon the lower surface of the table 17 and positioned to permit movement of said operating lever 111 in a vertical plane parallel to the face of the cam 112. The bell crank 108 is, however, in a different vertical plane aligned with the bending mechanism which is perpendicular to a tangent to a curved portion of the path 1 of movement of the stem 2 (Fig. 1) and is compensated for in the actuating means by swiveling movements of the linkage 110.

The leads 3 and 4 are bent in the continuing operation of the lead forming mechanism by the closing movements of the bending jaws 85 and 86 which are pivoted upon the pin 115 on the slide 81 and which are actuated by continued movement of the sub-slide 100 relative to said slide 81. The longer lead 4 is first to be engaged and is located properly with respect to the faces of the anvil 84 and the jaw 86 by being caught in the end slot 116 of a locating finger 117 on the jaw 86 during the early part of the closing movement. Further closing movements of the jaws 85 and 86 advance the faces of the corresponding clamping blocks 118 and 119 in the ends of the respective jaws against portions of said leads 3 and 4 in opposition to the anvils 83 and 84 so that said leads 3 and 4 are held therebetween. Finally, the motion of jaws 85 and 86 carries the teeth 120 and 121 projecting therefrom against and bends the end portions 78 and 79 of the leads 3 and 4 around the anvils 83 and 84 to positions substantially at right angles to the main portions thereof. During this latter operation, the clamping blocks 118 and 119 continue to apply pressure against the main portions of the leads 3 and 4, so as to prevent them from bowing out of position, said clamping blocks 118 and 119 being forced back within ways, located below the cover plates 122 and 123 over the end portions of the jaws 85 and 86, against the pressure of helical springs 124 (only one being shown) located in wells in said jaws 85 and 86 and the back ends of the clamping blocks 118 and 119. The motion of the jaws 85 and 86 which effects the bending of the leads 3 and 4 wipes the end portions 78 and 79 of said leads 3 and 4 around the anvils 83 and 84 and into position to pass into grooves along the top surfaces of the teeth 120 and 121, which grooves cause said ends 78 and 79 to be located in the plane of the leads 3 and 4. This manner of bending the leads 3 and 4 assures the arrangement of the open hooks in the ends thereof at properly spaced positions along the axis 80 of the stem 2.

The closing motion of the bending jaws 85 and 86 is brought about by the continued movement of the sub-slide 100 occurring after the slide 81 has been interrupted in its motion by the engagement of the stop screw 98 with the end of the arm 92. At that time, the continuing advance of the sub-slide 100 by the actuating means causes said sub-slide 100 to compress the spring 102 and also causes advancement of the plate cam 125 located upon the ridge 103 between the gibs 101 and 101', so that the rollers 126 on screws 127 in ends of the jaws 85 and 86 are spread apart by the diverging slots 128 and 128' in said cam 125. The spreading of the rollers 126 effects a like movement of the adjacent jaw portions which results in the closing movement of the jaws 85 and 86.

The following operations of the lead forming mechanism disengage it from the leads 3 and 4 of the stem 2 and are effected by the immediate retraction of the sub-slide 100 and the slide 81 by the actuating means. The jaws 85 and 86 are the first to be withdrawn from engagement with the leads 3 and 4 and are followed in their movement by the upward and retracting movements of the anvils 83 and 84. The upward movement of the anvils 83 and 84 disengages them from the leads 3 and 4 sufficiently to prevent them from pulling said leads from position in the retraction operation and is effected by the pivotal motion of the block 87 about the pin 89 due to the expansion of spring 93 when ear 90 on said block 87 retracts from the stop screw 91. These operations of the lead bending mechanism removes it from the path 1 of movement of the stem 2 and leads 3 and 4.

Figures 13, 14, 15:
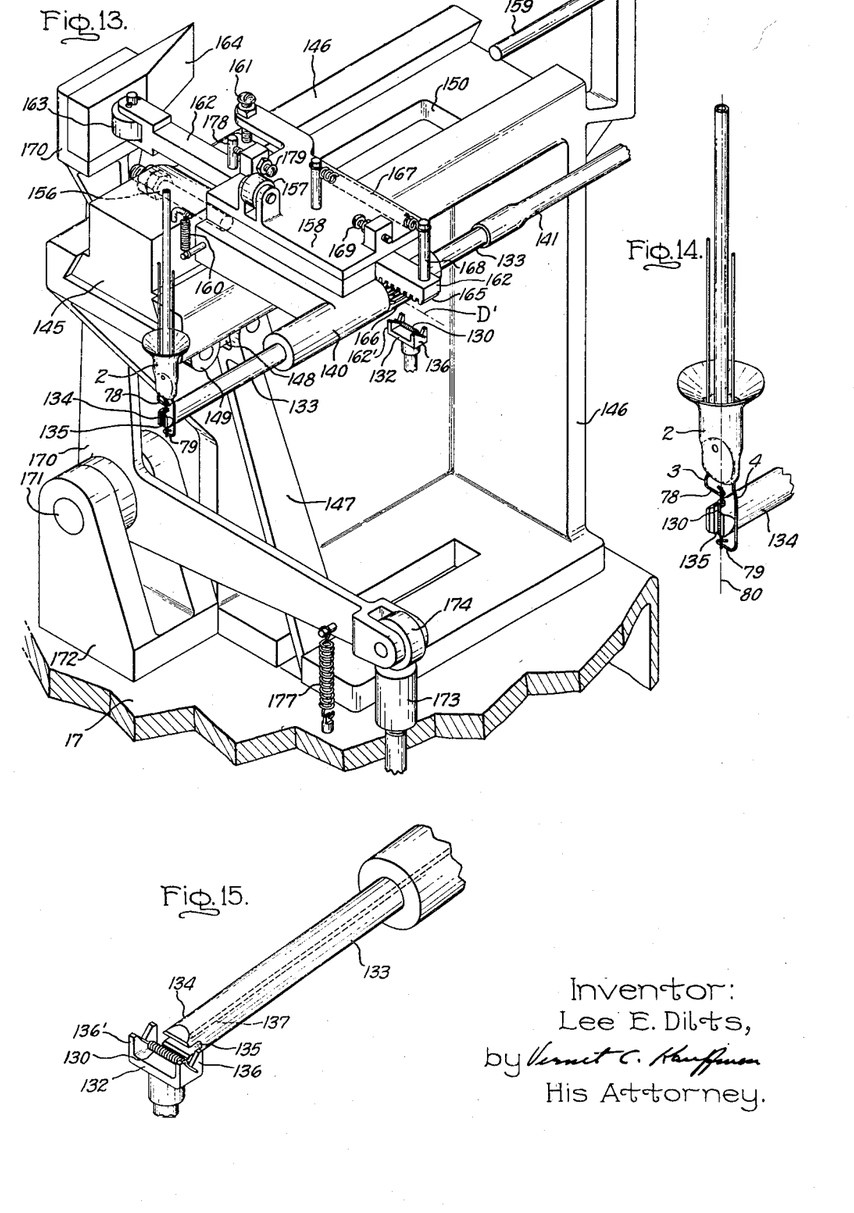
Fig. 13 is a perspective view of the filament transferring mechanism with the parts as arranged at the moment a filament is being placed between the open hooks of the leads of a stem.
Fig. 14 is a perspective view, on a larger scale, of a stem with the filament being inserted into the open hooks of the leads by the head of the transferring mechanism.
Fig. 15 is a perspective view of the head of the transfer mechanism at the moment a filament is being picked up from a feeding means.
Figure 16:
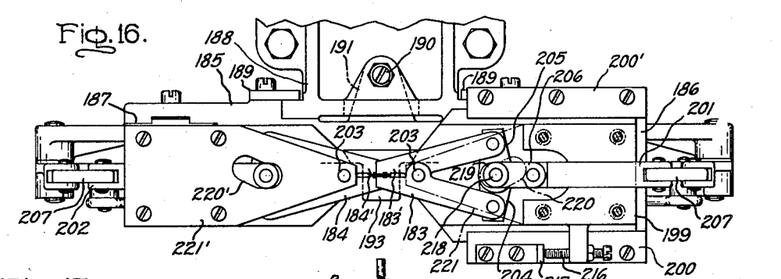
Figs. 16 and 17 are plan and side views, respectively, of the hook clamping mechanism at the moment said mechanism has completed the closing of the hooks on the leads.
Figure 17:
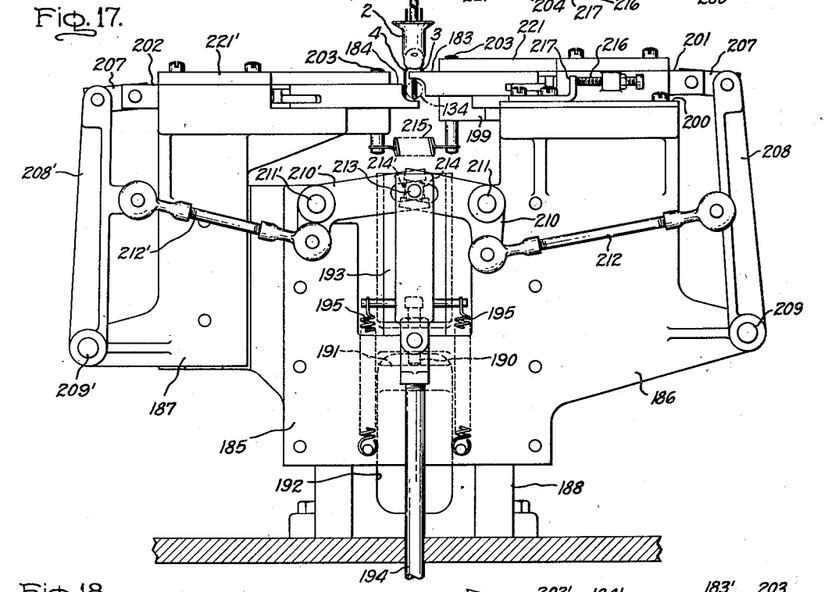
Figure 18:
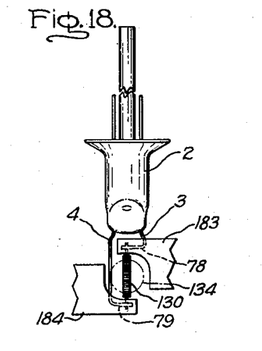
Fig. 18 is a side elevation, on a larger scale, of a mount with the hooks being closed by the jaws of the clamping mechanism.
Figure 19:
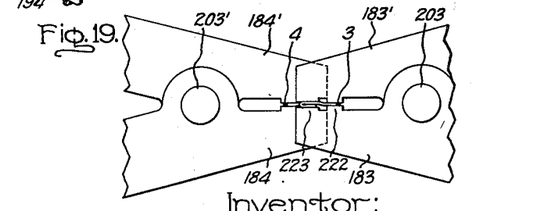
Fig. 19 is a plan view, on a still larger scale, showing the end portions of the hook clamping jaws at the full closed position on the leads.
Figure 20:
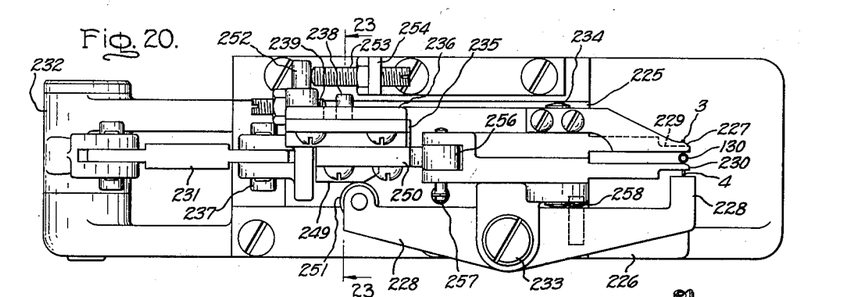
Figs. 20 and 21 are plan and side views, respectively, of the mount reforming mechanism at operative relation to a mount.
Figures 21, 22, 23:
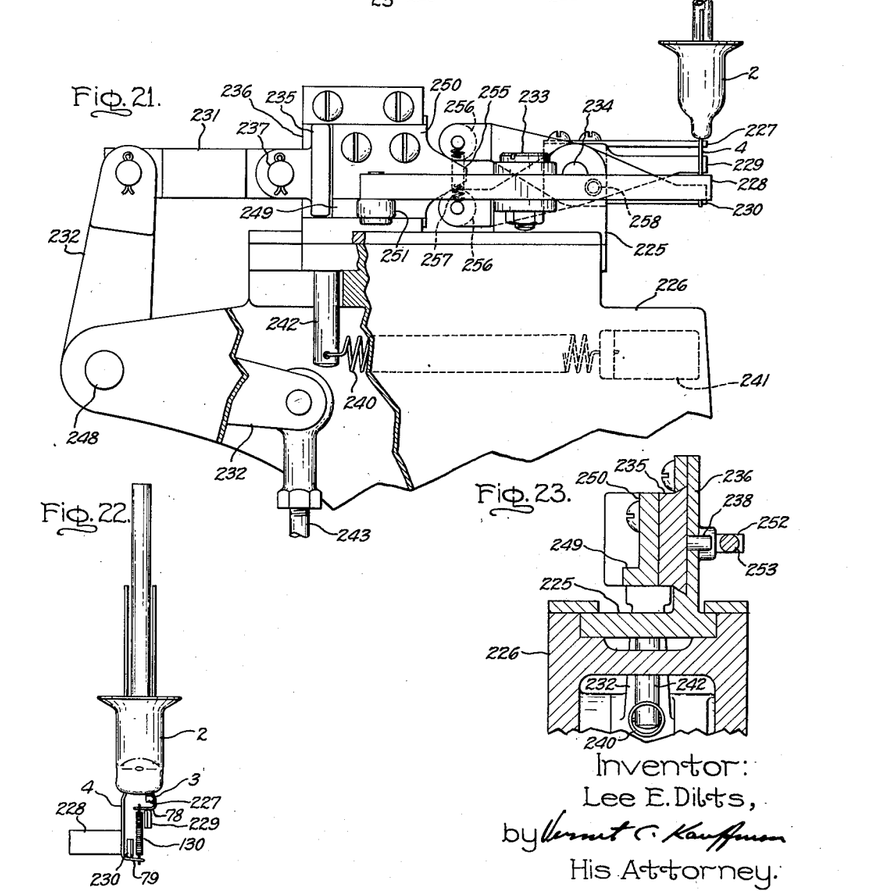
Fig. 22 is an elevation, at right angles to Fig. 21, of the mount with bending and blocking fingers of the mount reforming mechanism in operative relation thereto.
Fig. 23 is a vertical section through jaw supporting slides and a carriage of the mount reforming mechanism taken at the dot-dash line 23—23 in Fig. 20.

The next mount making operation to be performed occurs at station D, the next taken by the stem 2 in its course of movement along the path 1, and consists in the mounting of a coiled filament or cathode 130, as shown in Figs. 2 and 14, between the ends of the leads 3 and 4. The filament 130, previously coated with electron emissive material, is moved into mounting relation to the leads 3 and 4 from a position directly outward from station D, at which position it must be presented at the proper time interval with respect to the operation of the mounting apparatus either manually or by suitable mechanical means. The transfer of the filament 130 is performed by the transfer mechanism (Figs. 1, 13, 14 and 15) which is arranged to take said filament from a position D' adjacent the discharge end of a feeder which may be of the type disclosed in Patent 1,907,532 hereinbefore referred to, for instance, and which, as shown in Fig. 13 is adapted to present said filament 130 at said position D' by the vertical and lateral movement of an elevator 132. The cycle of operation of the transfer mechanism is initiated at a time when the transfer arm 133 thereof is located back from the stem 2 at station D and is tilted down (Fig. 15) to a position where the head end 134 is properly positioned at D' and the groove 135 across said head end 134 is in horizontal position. A filament 130 is also, at such time, in the course of being presented at position D' by the elevator 132 and is moved vertically and horizontally in a manner to carry the coiled-coil center portion of said filament 130 into the groove 135 in the head end 134. While said filament 130 is retained by the elevator 132, it is supported by its ends or legs which rest in the V notches in the upstanding end portions 136 and 136' of said elevator.

The first operation of the transfer mechanism occurs when the filament 130 is secured in the head end 134 of the transfer arm 133 by suction created at the base of the groove 135 through passage 137 by a source of vacuum connected to said arm 133 through valve 138 (Fig. 4) associated with the drum cam 139 on the main driving shaft 16. The suction under these conditions of operation is through the passage 137 traversing the full length of the transfer arm 133 (which extends completely through the support bearing of the carriage 140) and through piping, including the rubber hose 141 extending between the outer end of the arm 133 and the side outlet 142 of the valve 138. The rotation of the drive shaft 16 causes the cam 139 to leave the roller on the valving cylinder 143 of the valve 138 so that said cylinder 143 automatically moves to a position where a connection is made between the side outlet 142 and the pipe 144 from the vacuum source.

The filament 130 is carried from position D' to mounting relation to the leads 3 and 4 of the stem 2 immediately following the withdrawal of the elevator 132 and, in the course of this operation the filament is moved toward station D and at the same time is lifted to the proper relation to said leads 3 and 4 by movements of the transfer arm 133. The advancing movement of the transfer arm 133 is produced by the corresponding motion of the carriage 140 when the slide 145, to one side of which the carriage 140 is attached, is advanced in the horizontal ways in the standard 146 under the influence of actuating means associated with the main drive shaft 16. The slide 145 is actuated by a rocking movement of a lever 147 extending upward through openings in the table 17 and base of the standard 146 to a position below the slide 145 and connected by the link 148 to a depending lug 149 extending through an opening 150 in the ways thereof. Other portions of the actuating means comprises the drum cam 139 on the shaft 16 and the roller 151 which bears against the edge 152 of said cam and which rocks the lever 147 about the pivot pin 153 on a bracket 154 extending from the lower surface of the table 17. The helical spring 155 (Fig. 4) extending between the upper end of the lever 147 and a post held by the table 17 causes said lever 147 to hold the roller 151 against the edge 152 of the cam 139 and so that said lever 147 is consequently moved by variations in said edge 152. The filament lifting movement of the transfer arm 133 results from a tilting motion thereof carrying it up to the horizontal position shown in Fig. 13 and results from a rotation of the carriage 140 about the axis of the stud 156 which mounts it upon the side of the carriage 140 and slide 145 carries the roller 157 on the upstanding lug of the cover plate 158 on the top of the carriage 140 away from the end of the pin 159 at the back part of the standard 146 and the contraction force of the helical spring 160, located between posts on the forward ends of the carriage 140 and the slide 145, turns said carriage 140 and the pin 156 in a clockwise direction (Fig. 13). The transfer arm 133 reaches the proper elevation when the stop screw 161 in an ear on the cover plate 158 seats against the top of the back portion of the slide 145.

Further operations do not occur during the transfer of the filament 130 until the transfer arm 133 is about to reach the stem 2. At that time, the filament 130 is turned bodily to almost an upright position by the clockwise (Fig. 13) rotation of the transfer arm 133 within the bearing of the carriage 140 so that its ends will be before the open ends of the hooks in the leads 3 and 4 when the advance is complete and can be turned into said hooks by further rotation of said transfer arm 133. This particular rotative motion of the transfer arm 133 results from the outward movement of a slide 162 within ways in the carriage 140 (caused by the passage of a roller 163 on one end thereof onto the thicker portion of the wedge cam 164) and turns the transfer arm 133 through engagement of teeth of a rack 165 on the opposite end of the slide 162 with the intermeshing teeth of a gear segment 166 on a mid-portion of the transfer arm 133. The normal or rest position of slide 162 (whereby the transfer arm 133 is held with its groove horizontal) is determined by the engagement of post 168 thereon with a stop screw 169 in a lug on the cover plate 158, the said post 168 being held in that position by a spring 167 extending between post 168 and a post on plate 158.

The final rotation of the transfer arm 133, occurring after it reaches the limit of its advance, turns the ends of the filament 130 into the open hooks, in the end portions 78 and 79 of the leads 3 and 4, by rotating the filament 130 to a vertical position aligned with the longitudinal axis 80 of the stem 2. The few degrees of rotation constituting this movement is brought about by further motion of the operating slide 162 caused by motion of cam 164 toward the slide 145 and the carriage 140, and is initiated by a rocking movement of the support lever 170 for said cam 164 under the control of actuating means associated with the main drive shaft 16. The cam supporting lever 170 is pivoted about the pin 171 in the bracket 172 upon the upper surface of the table 17 and takes the motion of an operating rod 173 which engages the roller 174 on one end of lever 170 and which extends downward through an opening in the table 17 and a bearing (not shown) to a yoke 175 adjacent the face of the cam 176. Contact between the roller 174 on the cam supporting lever 170 and the operating rod 173 is maintained by a spring 177, extending between posts in one end of said lever 170 and an adjacent portion of the table 17, and such contact continues until the transfer arm 133 has turned the filament 130 to the proper position as determined by the blocking of further movement in the operating slide 162. At such time, the post 178 on the operating slide 162 engages the stop screw 179 in a stationary lug on the cover plate 158 and prevents further motion. Further motion of the operating rod 173, however, continues as said operating rod 173 is actuated by the passage of the roller 180 on the side of the yoke 175 into different parts of a channel in the face of the cam 176 and the top end of said operating rod 173 drops below the roller 174 on one end of the lever 170.

A short period now occurs in the operation of the transfer mechanism during which it functions only as a means for holding the filament 130 in place while the open hooks in the leads 3 and 4 are closed on the filament by the clamping device which is also located at work station D. The filament 130 continues to be held by the transfer mechanism inasmuch as the vacuum connection to the transfer arm 133 continues to be maintained by the valve 138 and said connection is not changed until said transfer arm 133 starts to retract from station D as the first step in the return movement and the cycle-completing operation of said transfer mechanism. At such time, the valving cylinder 143 of the valve 138 is moved by the advance of a projecting portion 181 of the cam 139 against the roller on the end of said cylinder 143 so that the vacuum connection between the side outlet 142 and the source 144 is broken and the compressed air source 182 is connected to said side outlet 142. The application of air at relatively low pressure to the transfer arm 133 from said source 182 assists in separating the head end 134 of said transfer arm 133 from the filament 130 without damage as the said transfer arm 133 retracts.

The following operations in the completion of the cycle performed by the transfer mechanism consists of rotative and tilting movements of the transfer arm 133 occurring during the course of the retraction movement of said transfer arm 133 which movement results from motion of the slide 145 in the ways of standard 146. The rotating of the transfer arm 133, in the present instance, occurs at the time the head end 134 thereof is clear of the filament 130 as the roller 163 on the operating slide 162 then passes from cam 164 and the resulting longitudinal motion of said slide 162 turns said head end 134 sufficiently to rotate the groove 135 therein from a vertical to a horizontal position. The only operation now required of the transfer arm 133 to prepare it to pick up a succeeding filament 130 at position D' is the tilting movement thereof which occurs when the roller 157 strikes the end of the stationary pin 159 and the carriage 140 is turned about the axis of the stud 156. During the retraction and rearrangement of the transfer arm 133, the cam 139 is turned so that the projecting portion 181' of the cam 139 is located below the roller on the control cylinder 143 of the valve 138. No connections are made through the valve 138 at the resulting position of the cylinder 143.

The hook clamping mechanism associated with the cathode transfer mechanism at station D and appearing in greater detail in Figs. 16 through 19 provides for the closing of the hooks in the leads 3 and 4 by operations of pairs of jaws 183, 183' and 184, 184' respectively. The pairs of jaws 183, 183' and 184, 184' are, at the time the stem 2 is indexed to station D and the cycle of operation of the device begins, located at a rest position below the path of travel of the leads 3 and 4 and in said cycle are raised to the respective elevations of the hooks in said leads 3 and 4. Both pairs of jaws 183, 183' and 184, 184' maintain throughout the cycle of operation a fixed relation vertically with respect to the carriage 185 which supports jaws 183 and 183' upon a fixed wing 186 at the right side (Figs. 16 and 17) thereof and jaws 184 and 184' upon the vertically adjustable wing 187 at the left side thereof; and said pairs of jaws are raised to the proper positions by movement of said carriage 185 upward along the upstanding section of the standard 188. Vertical slide ways are provided behind the plates 189, 189 on the back of the carriage 185 to permit it to slide on the upstanding section of the standard 188 which is mounted at a fixed position upon the table 17. The limit of the vertical positioning movement of the carriage 185 is determined by a stop in the form of a screw 190 in the path of movement of an ear 191 which projects from said carriage 185 and which moves within a vertical opening 192 in standard 188. The positioning movement of the carriage 185, like all other operations of the clamping mechanism, is taken from movements of an operating slide 193 located in ways in the vertical face of the carriage 185 opposite from the standard 188. The movements are effected by actuating means associated with the main drive shaft 16 and effecting timed vertical motion in said operating slide 193 through the movements of the operating rod 194 attached to the lower end thereof. The vertical motion of the operating slide 193 is transferred to the carriage 185 by helical springs 195 extending from posts on opposite sides of said slide 193 and other posts in carriage 185 and occurs when the yoke 196 on the lower end of the operating rod 194 is raised and lowered by variations of a channel in the face of the cam 197 and engaged by the roller 198 on said yoke 196.

The next step in the operation of the clamping mechanism occurs after the filament 130 is arranged properly with respect to the leads 3 and 4 and causes the open hooks in the laterally extending lead portions 78 and 79 to be closed on the filament 130. This step is performed, in the instance of jaws 183 and 183', by a horizontal positioning movement of said jaws 183 and 183' advancing them to operative relation to the lead portion 78 and a following closing movement thereof on said lead portion 78. In the instance of jaws 184 and 184', this operative step is simply a closing movement thereof on the lead portion 79. The positioning of the jaws 183 and 183' results from motion of the jaw support slide 199 within horizontal ways below the plates 200 and 200' on the upper portion of the fixed wing 186 of the carriage 185 and is produced, together with the closing movements thereof, by a corresponding motion of a sub-slide 201 within ways of the support slide 199. An operating slide 202 of the same form as sub-slide 201 produces the closing movement of the jaws 184 and 184' and, like said sub-slide 201, is under the control of a lever system on the face of the carriage 185, a system which differs from that provided for said sub-slide 201 only in the proportions of the parts inasmuch as the operating slide 202 is not required to have the same length of movement as said sub-slide 201.

Referring in detail to the elements of the clamping mechanism, the pairs of jaws 183, 183' and 184, 184' are correspondingly mounted for pivotal motion about the pins 203, the pin 203 associated with jaws 183 and 183' being carried by the forward end of the support slide 199 and the pin 203 associated with jaws 184 and 184' being carried by a corresponding portion of the vertically adjustable wing 187 of the carriage 185, and the pairs of jaws are each closed by a toggle arrangement (only shown in one instance) formed by inter-connected ends of said pairs of jaws 183—183' or 184—184', the links 204 and 205, and the hinged end section 206 of the sub-slide 201 or the operating slide 202. In each instance, the end of the sub-slide 201 or operating slide 202 opposite from the toggle joint is connected by a link 207 to a lever 208 (or 208') pivoted upon a pin 209 (or 209') extending from the respective wing 186 or 187 of the carriage 185, and is actuated by the motion of a bell crank 210 (or 210') about the axis of the pin 211 (or 211') and connected to the lever 208 (or 208') by the link 212 (or 212'). The motion of the sub-slide 201 or operating slide 202 occurs when the continued upward movement of the operating slide 193, effected by the actuating means after the carriage 185 has been positioned, causes said operating slide 193 to move in the ways of said carriage 185 and, during said motion, turns the bell cranks 210 and 210' about the pins 211 and 211' through the connection formed therebetween by the pin 213 and the bearing blocks 214—214' which are located within a slot in the upper end of the operating slide 193. The connection provided between the operating slide 193 and the carriage 185 by the springs 195—195 is not distributed during this operating interval as said springs 195—195 stretch sufficiently to accommodate the motion. The positioning motion of the jaws 183 and 183', as produced by the movement of the support slide 199, occurs during the first movement of the sub-slide 201 when said movement permits the contraction force of a spring 215 (extending between posts in the forward end of said slide 199 and the directly opposite portion of the wing 187 of the carriage 185)

to move said slide 199 forward in the ways of wing 186. At the limit of the advance of the support slide 199, the step screw 216 upon a sideward projecting ear thereof bears against the upstanding end of the stationary stop 217 attached to the carriage 185 and prevents further movement of said slide 199 so that the motion of the sub-slide 201 is directly converted to the operation of the jaws 183 and 183' in the same manner as the operating slide 202 actuates the jaws 184 and 184'. The proportions of the bell cranks 210 and 210' and the levers 208 and 208' are such as to compensate for the greater movement required of the sub-slide 201 to effect the motion of the support slide 199.

The manner of closing the pairs of jaws 183, 183' and 184, 184' is such as to effect the closing of the open hooks in said leads 3 and 4 without materially displacing said leads during the closing operation and such that the coacting faces of the jaws are properly aligned with the leads 3 and 4 and the filament 130 when they are finally fully closed thereon. This method of operation is effected by bringing the faces of the backing jaws 183' and 184' of the pairs against the main body of the leads 3 and 4 at the same time that the faces of the opposite jaws 183 and 184 are engaging the end of the open hooks, and in closing said backing jaws 183'—184' and opposed jaws 183—184 different amounts to compensate for the greater movement required in closing the open ends of the hooks. The control over the closing movements of the jaws 183, 183', 184 and 184' is afforded by varying the direction of travel of the center point of the operating toggle as illustrated in connection with jaws 183 and 183' wherein the center point of the toggle joint is the pin 218 and wherein rollers 219 (only one being shown) on top and bottom portions thereof are caused to move in corresponding cam slots (like that indicated at 220) in a cover plate 221 and in the support slide 199. The hinged end section 206 of the sub-slide 201 permits the pin 218 and the rollers 219 to follow the course of the cam slots 220 which effects relatively little motion in the jaw 183' until jaw 183 closes the hook in the lead 3 and said hook is set by clamping. The cam slots 220' associated with the operation of the jaws 184 and 184' are located in the cover plate 221' and, although not shown, in the portion of the wing 187 of the carriage 185 below said jaws 184 and 184'. As shown in greater detail in Figs. 18 and 19, the jaws 183, 183', 184 and 184' are relieved at their ends so as to clear the head end 134 of the filament transfer arm 133 and have face pads 222 and 223 of the proper thickness to arrange the main portion and thicker hook portions of the leads 3 and 4 in the same plane. No further operations are performed on the leads 3 and 4 by the clamping mechanism in the cycle of operation thereof, and said cycle is completed by the downward movement of rod 194 to effect withdrawal of the jaws 183, 183', 184 and 184' thereof to a position below the stem 2 in exactly the reverse order to the described closing movements.

The stem 2 is advanced from the filament transfer and the hook clamping mechanism at work station D, which complete the mounting of a filament 130 on the leads 3 and 4 thereof, by an index of the stem carrier to a following idle station and then to another work station E. The assembly comprising the stem 2, the leads 3 and 4 and the filament 130 which is referred to in the art as a mount, is adjusted at station E by a mechanism which fixes a slight tension in the filament 130 by bending the laterally extending end portions 78 and 79 of the leads 3 and 4 farther from each other. This operation improves proper functioning of the filament 130 when it is finally assembled in an electrical device by placing it under sufficient tension to hold the turns thereof in position upon expansion under the heat of operation in said electrical device, and is performed by the mount reforming mechanism shown in detail in Figs. 20 through 23.

The mount reforming mechanism starts its cycle of operation from a position to the inside of the path 1 of movement of the stem 2 and below the center support 15 of the stem carrier so as to be clear of the stems 2 moved therealong and it is moved to and from operative relation to a stem 2 in said path in the course of its operative movements. The advancing motion of the mount reforming mechanism occurs when the slide 225 is moved in ways in the stationary standard 226 to carry the tips of the blocking fingers 227—228 and bending fingers 229—230 to the plane of the leads 3 and 4 extending from the stem 2, and is the result of a corresponding motion of the link 231 connected to an arm of the operating lever 232 under the control of actuating means associated with the main drive shaft 16. The motion of the blocking fingers 227—228 and the bending fingers 229 and 230, at such times, is that of the slide 225 inasmuch as the blocking finger 227 is mounted at a fixed position upon the forward end of the slide 225, the blocking finger 228 is mounted for horizontal pivotal movement about the pivot screw 233 in the slotted lug extending from the side of the forward end of said slide 225, and the bending fingers 229 and 230 are mounted for vertical pivotal movement upon a pivot pin 234 extending through bearing bosses raised above the forward end of said slide 225. The slide 225, in turn, carries a sub-slide 235 which is located within ways in a vertical appendage 236 extending longitudinally along the back portion of slide 225 and which is connected to the link 231 by the pin 237 and has the same motion as said link 231 and the lever 232 in that the slide 225 and the sub-slide 235 are then maintained at a definite relation. Such a condition exists as a stud 238 (Fig. 23) which extends through a slot in the appendage 236 of the sub-slide 235 seats against the end of a stop screw 238 (Fig. 20) on said appendage 236 due to the bias effected by the contraction force of a helical spring 240 extending between a fastening 241 on the standard 226 and a post 242 depending from the lower surface of the slide 225. A slot in the ways in the standard 226 prevents interference between the post 242 and said standard during the movement of the slide 225.

The sequence of motion required to advance the blocking and bending fingers 227, 228 and 229, 230 is completed by the controlled motion imparted to the operating lever 232 by the actuating means, which means includes the rod 243 (attached at its upper end to said lever 232 and extending downward through openings in the standard 226 and the table 17), the lever 244 adjacent main drive shaft 16, and the cam 245. The rotation of the shaft 16 turns the cam 245 so that the differently shaped portions of the track in the face thereof engaged by the roller 246 turn the lever 244 about the stationary pivot pin 247 to produce vertical motion in the rod 243 which turns the operating lever about the pivot pin 248 in the standard 226.

The hereinbefore referred to horizontal advance of the blocking and bending fingers 227, 228 and 229, 230, respectively, constitutes the major portion of the positioning movement thereof and is supplemented by an independent positioning movement of the blocking finger 228 effected by horizontal motion about the pivot screw 233. This final positioning motion of the blocking finger 228 occurs when the actuating means advances the link 231 still further and causes it to push the sub-slide 235 forward in its ways in the slide 225 and thereby force the laterally enlarged portion 249 of the cam 250 on said sub-slide 235 against the roller 251 on the remote end of said blocking finger 228. The slide 225 is prevented from moving during this last interval by the presence of the stud 252 on the appendage 236 against the stop screw 253 on the bracket 254 on the edge of standard 226. The final positioning movement of the blocking finger 228 carries it against a side portion of the lead 4 opposite from the filament 130 at a position adjacent the laterally extending end 79 of said lead 4 and positions said blocking finger 228 to function in the same manner as the blocking finger 227 which was arranged against the side of lead 3 nearest the filament 130 at a point adjacent the laterally extending end 78 of said lead 3. While the blocking fingers 227 and 228 are located in these described positions they prevent the leads 3 and 4 from bowing out of position in the subsequently occurring rearrangement of the laterally extending ends of said leads 3 and 4 effecting the stretching of the filament 130. The blocking fingers 227 and 228 also have the function of assisting the bending fingers 229 and 230 in the rearrangement of said laterally extending ends 78 and 79, respectively, of the leads 3 and 4.

The lead bending operation of the mount forming mechanism occurs when the continued motion of the sub-slide 235 causes the wider portion of the flared end 255 of the cam 250 to be forced between corresponding rollers 256, 256 on the remote ends of the bending fingers 229 and 230 so that said bending fingers are turned about the pivot pin 234 and the proximate ends thereof adjacent the leads 3 and 4 are moved farther apart. The motion of the bending fingers 229 and 230, which is produced against the contracting force of a helical spring 257 located between posts in the remote ends thereof adjacent the cam 250, causes said proximate ends of said fingers 229 and 230 to engage and bend the laterally extending ends 78 and 79 of the leads 3 and 4 away from each other an amount necessary to cause said ends to finally set in positions to hold the filament 130 in a properly stretched condition. The extent of the motion of the fingers 229 and 230 is sufficient to compensate for the spring back of the laterally extending ends 78 and 79 of the leads 3 and 4 and to stretch the turns of the twice coiled refractory wire making up the body of the filament 130 sufficiently to compensate for the expansion thereof when it is operated at high temperature. This manner of holding the filament 130 also provides for a slight tension in the filament while it is being operated in an electrical device so that the coils thereof will maintain proper interrelation and position within said device.

The cycle of operation of the mount reforming mechanism is completed by the return movements of the bending fingers 229 and 230, and the blocking finger 228 which disengage them from the leads 3 and 4 and is followed by the retraction of said fingers as well as the blocking finger 227 which again arranges them to one side of the path 1 of movement of the mount. These operations of the mount reforming mechanism occur with the downward return motion of the operating rod 243 which first results in the retraction of the sub-slide 235 and which then effects the combined retraction of said sub-slide 235 and the slide 225. The sideward motion of the blocking finger 228, which carries it away from the lead 4, is produced by the expansion force of a helical spring 258 located between the forward end of said finger 228 and an adjacent portion of the slide 225 when the independent motion of the sub-slide 235 moves the cam 250 back.

In the case of a shielded cathode structure a further mounting operation occurs at station F, the immediately succeeding work station taken by the stem 2 along the path 1. At station F, a cylindrical shield 260 (Fig. 3) is assembled in the mount on the stem 2 by a mechanism 261 (Fig. 1) which is located on the table 17 at a position below the path of the stem 2 and which provides for the formation of said shield 260 and the attachment thereof to the mount. The mechanism 261, which is disclosed in full detail in the application of F. J. Grube et al hereinbefore referred to forms the shield 260 from sections cut from a metal ribbon 262 at a position below the mount and then raises the shield 260 to proper relation to the mount by transferring it vertically to the position around the filament 130 and the coextensive portion of the longer lead 4. The shield 260 is made fast to the lead 4 by a crimping operation which forms indentations in the portion thereof contiguous to said lead 4 without disturbing the general form and arrangement thereof. The shield forming, transferring and attaching means of the device 261 are disclosed in full detail in the above referred to application of F. J. Grube et al, and are controlled in their operative cycle so as to function properly with the advance of succeeding stems 2 to station F by actuating means below the table 17 and associated with the main drive shaft 16.

In general, the device 261 causes the metal ribbon 262, from which the shields 260 are made, to be pulled lengthwise from a reeled source thereof (not shown) adjacent the rolls 263 of a conventional straightener by the feeding means indicated at 264 and operated by the cam 265 and lever 266 of the actuating means. A channel in the face of the cam 265 is engaged by a roller 267 on the lever 266 which is turned about a stationary pin 268 retained by a bracket (not shown) on the lower surface of the table 17 and which moves the operating rod 269 in a manner to effect the properly timed operation of said feeding means 264. The ribbon 262 is advanced to a position adjacent a mandrel 270 (partially shown in Fig. 3) of the shield forming means, which occupies a position directly below the mount of station F, and in the course of the operations thereof is wrapped about said mandrel 270. The forming means of the device 261 is operated by cooperating movements of the levers 271 and 272 of actuating means adjacent the drive shaft which levers are turned about respective portions of pivot pin 273 in accordance with the position of portions of the channels in the near faces (Fig. 4) of the cams 265 and 274, respectively, and engaged by rollers on one end of said levers 271 and 272. The transferring means of the device 261 pushes the shield 260 from the mandrel 270 of the forming means by the upward motion of the stripper 275 and in so doing elevates it to proper relation to the mount and into operative relation to the crimping jaws 276 and 277 of the attaching means by the movements of an operating rod 278 connected to the lever 279 opposite the far face of the cam 274. The lever 278 in turn, engages a channel in the said far face of the cam 274 by means of a roller (not shown) and is turned about the pin 273. In the course of the operation of the shield forming means, a length of the metal ribbon 262 is bent so that the ends of the length forms the cylindrical shield portion and so that the center of said length forms a corrugation 280 suited to hold lead 4. The transfer means of the device 261 elevates the shield 260 end foremost in a manner whereby the cylindrical main portion thereof is carried up about the filament 130 and the longitudinal corrugation 280 in the wall thereof passes over the portion of the lead 4 adjacent thereto. The attachment of the shield 260 to the lead 4 occurs when the matching irregularities of the faces of the jaws 276 and 277 close on the corrugation 280 and deform it sufficiently to fix it firmly to said lead 4. At the conclusion of the crimping operation the parts of the transferring and attaching means are lowered so as to again be below the path 1 of movement of the mount.

Although a preferred embodiment of the invention has been disclosed, it will be understood that the invention is not to be limited to the specific construction and arrangement of parts shown, but that these parts may be widely modified within the spirit and scope of the invention as defined by the appended claims.

What I claim as new and desire to secure by Letters Patent of the United States is:

1. In a mount making machine for electric lamps and similar devices, the combination of means for holding a stem having a pair of leads of different lengths extending downwardly from one end thereof along opposite sides of the vertical longitudinal axis of the stem and being bent to extend laterally with hooked ends enclosing said axis and facing horizontally in opposite directions, and mechanism for mounting a filament between the leads and including a transfer arm movable longitudinally in a horizontal direction between the stem in said holding means and an adjacent filament receiving position, the said transfer arm being rotatable about its axis and including means for holding a filament by engagement with a mid-portion thereof, means for moving the transfer arm longitudinally forward toward said stem, means operable upon forward movement of said arm to rotate the arm about its axis sufficiently to turn a filament held thereby from a horizontal position to a nearly vertical position, means operable upon the conclusion of the forward motion of said arm to effect slight additional rotation of the arm to bring the filament into a vertical position aligned with the stem axis and with the ends of the filament in the hooked ends of the leads at the work station, and means thereafter operable to clamp said hooked ends for attaching the ends of the filament to the leads.

2. In a mount making machine for electric lamps and similar devices, the combination of means for holding a stem having a pair of leads of different lengths extending downwardly therefrom along opposite sides of the vertical longitudinal axis of the stem and having hook-shaped end portions bent to extend laterally across said axis, and mechanism for mounting a filament between said end portions of the leads comprising a horizontal transfer arm, means for moving the transfer arm longitudinally between the stem in said holding means and an adjacent filament receiving position and including a slide member mounted in horizontal ways and mounting said transfer arm for rotation about its axis, a suction head at the end of the transfer arm for holding a filament by engagement with a mid-portion thereof, actuating means for moving the slide forwardly toward said stem and means operable upon said forward motion of the slide for rotating the transfer arm to cause the said head end thereof to pick up a filament disposed in a horizontal position at the said receiving position and to carry said filament into a vertical plane including the stem axis and between the leads of the stem while rotating the filament to a nearly vertical position, means operable upon conclusion of the forward motion of the slide and arm for then rotating the transfer arm still further to carry the ends of the filament into the hooks in the leads and the main portion thereof into alignment with the stem axis, and means for closing the hooks upon the ends of the filament.

3. In a mount making machine for electric lamps and similar devices, the combination of means for holding a stem having a pair of leads of different lengths extending downwardly therefrom along opposite sides of the vertical longitudinal axis of the stem and having hook-shaped end portions bent to extend laterally across said axis, and mechanism for mounting a filament between said end portions of the leads comprising a horizontal transfer arm movable longitudinally between the stem in said holding means and an adjacent filament receiving station, means at the head end of the transfer arm for holding a filament by engagement with the mid-portion thereof, a carriage mounting the transfer arm for rotation about its axis, a slide mounting the carriage for rotation about a horizontal axis, means for effecting such rotation of the carriage to cause the transfer arm to be tilted downwardly at the said receiving position to pick up the filament located thereat, means providing horizontal ways for the slide to cause the transfer arm to be moved longitudinally between said receiving station and the stem in said holding means, means operable upon movement of the slide and arm forwardly toward the stem for rotating the arm in its carriage sufficiently to turn a filament held thereby from a horizontal to a nearly vertical position, means operable upon conclusion of the forward motion of the slide and arm for additionally rotating said arm to carry the filament to a vertical position with its ends in the said hook-shaped end portions of the leads, and means for closing the hooks upon the ends of the filament.

4. A filament transfer mechanism comprising a transfer arm having means at its head end for holding a filament by engagement with the mid-portion thereof, means mounting said transfer arm to normally extend horizontally and to reciprocate longitudinally between a retracted pick-up position and an advanced delivery position, means for reciprocating said arm as aforesaid, means operable upon advancing movement of said arm to rotate it about its own axis to turn a filament held by its head end from a horizontal position to a nearly vertical position, and means operable upon conclusion of the advancing movement of said arm to effect additional slight rotation of said arm to bring the filament held thereby into a vertical position.

5. A filament transfer mechanism comprising a support standard, a slide mounted for horizontal reciprocation in said standard, a carriage mounted on the side of said slide for rotation about a horizontal axis extending transversely of the direction of motion of said slide, a transfer arm mounted on said carriage for rotation about its own axis and extending longitudinally of said slide, means at the head end of said arm for holding a filament by engagement with the mid-portion thereof, means coupling said carriage to said slide to normally hold it thereon with the said arm extending horizontally, means for reciprocating said slide to carry said arm longitudinally between a retracted pick-up position and an advanced delivery position, means on said standard and engageable with said carriage at the retracted position of said slide to tilt said carriage and the arm thereon downward with the head end of said arm arranged to receive a horizontally disposed filament, means operable upon forward motion of said slide to effect rotation of said arm about its axis an amount sufficient to bring the filament held thereby to a nearly vertical position, and means operable when said slide and arm have advanced to the delivery position to effect a final slight rotation of said arm to bring the filament held thereby into a vertical position.

References Cited in the file of this patent

UNITED STATES PATENTS

| | | |
|---|---|---|
| 1,816,683 | Ledig | July 28, 1931 |
| 1,821,894 | Otaka | Sept. 1, 1931 |
| 1,901,087 | Dalheimer | Mar. 14, 1933 |
| 1,907,532 | Flaws | May 9, 1933 |
| 2,114,844 | Krause | Apr. 19, 1938 |
| 2,251,158 | Dgrodowy | July 29, 1941 |
| 2,313,544 | Hampton | Mar. 9, 1943 |
| 2,380,742 | Flaws | July 31, 1945 |
| 2,572,771 | Russell | Nov. 20, 1951 |
| 2,626,637 | Coughlin | Jan. 27, 1953 |
| 2,640,509 | Kulberg | June 2, 1953 |
| 2,641,286 | Quinn | June 9, 1953 |
| 2,676,622 | Vargo | Apr. 27, 1954 |
| 2,701,588 | Hollopetre | Feb. 8, 1955 |